(12) United States Patent
Lee et al.

(10) Patent No.: US 8,331,049 B2
(45) Date of Patent: Dec. 11, 2012

(54) DETECTING TOUCH DOWN AND/OR ASSESSING QUALITY IN A HARD DISK DRIVE

(75) Inventors: SungChang Lee, San Jose, CA (US); Brian Thornton, Mountain View, CA (US); Mike Suk, Palo Alto, CA (US); SeungMo Kang, Palo Alto, CA (US)

(73) Assignee: Seagate Technology International, Grand Cayman (KY)

( * ) Notice: Subject to any disclaimer, the term of this patent is extended or adjusted under 35 U.S.C. 154(b) by 365 days.

(21) Appl. No.: 12/796,346

(22) Filed: Jun. 8, 2010

(65) Prior Publication Data
US 2011/0299190 A1 Dec. 8, 2011

(51) Int. Cl.
*G11B 27/36* (2006.01)
*G11B 21/02* (2006.01)

(52) U.S. Cl. ............................................. 360/31; 360/75
(58) Field of Classification Search ....................... None
See application file for complete search history.

(56) References Cited

U.S. PATENT DOCUMENTS
2007/0268605 A1* 11/2007 Ryu ................................ 360/31
2011/0242955 A1* 10/2011 Ehrlich et al. ............. 369/53.39

* cited by examiner

*Primary Examiner* — Andrew L Sniezek (57) ABSTRACT

This application discloses a hard disk drive and a control circuit that are configured to determine touchdown by determining the SAGC for a track, removing the repeatable component of the SAGC to create the non-repeatable component and determining an indication of clearance irregularity and/or touch down when the standard deviation of the non-repeatable component spikes. These operations may create a defect map and/or a Flying height On Demand (FOD) control table in or for the hard disk drive as products of operating the hard disk drive.

25 Claims, 6 Drawing Sheets

DETECTING TOUCH DOWN AND/OR ASSESSING QUALITY IN A HARD DISK DRIVE

TECHNICAL FIELD

This invention relates to detecting touch down and/or assessing quality in hard disk drives.

BACKGROUND OF THE INVENTION

Hard disk drives access data stored on their disk surfaces by positioning a slider containing a read-write head over a track on one of the disk surfaces. They require careful control of the clearance of the slider over the accessed disk surface to insure the reliability of reading and writing the data. Since the incorporation of Flying height On Demand (FOD) capabilities, tables of FOD control values for various zones of tracks on the disk surface are often used. These tables may list an extreme control value, after which the slider experiences Head to Disk Contact, which is referred herein as Touch Down (TD).

The tracks of the disk surface are often organized into servo wedges radiating from the disk drive's spindle hub. Each servo wedge contains a servo region separating a user data region from the user data region of a neighboring servo wedge. The servo region often includes an Amplitude Gain Control (AGC) signal region. The AGC signal region is written with an analog signal pattern that may be read to create an AGC calibration signal, which is then used to create a Servo AGC (SAGC) value. The SAGC value controls the amplification gain the read-write head in accessing the servo data region.

The need to know when touch down occurs has been a long term concern, but the problems of detecting touch down have worsened as clearance tolerances have narrowed. What works well at a clearance of ten nanometers (nm) may be too erratic for clearances below three nm. For instance, in the past touchdown could be determined by considering the average SAGC for different power levels of FOD control, but this has been found unreliable at low clearances. Also methods that estimate slider tangential (off-track) disturbance due to contact fail near a Mid-Disk track, because the disturbance is parallel to the track.

SUMMARY OF THE INVENTION

Embodiments of the invention include a hard disk drive that determines touchdown by determining the SAGC for a track, removing the repeatable component of the SAGC to create the non-repeatable component and determining an indication of clearance irregularity and/or touch down when the standard deviation of the non-repeatable component spikes. To spike means to deviate from a determined baseline.

The hard disk drive may include a FOD control table listing the control value that induces touch down, which may be created at least in part by this method of determining touch down.

The disclosed operations of the hard disk drive do not make inherent use of how the clearance is controlled, nor how the read-write head operates, nor how the disk surface is organized or formatted beyond having servo wedges intersecting tracks to include AGC regions.

Manufacturing the hard disk drive may include operating an assembled hard disk drive to determine whether touch down occurred at various FOD control values for specific zones of tracks to create the FOD control table and/or a defect map.

The assembled hard disk drive may be acceptable to ship or defective. In either case, the defect map is a useful product of the manufacturing process. It can be used to diagnose quality problems in the manufacturing process and by the control system of the shipped hard disk drive to aid managing its operations.

DETAILED DESCRIPTION

This invention relates to detecting touch down and/or assessing quality in hard disk drives. It discloses a hard disk drive, a control circuit and a processor that determine touchdown by determining the SAGC for a track, removing the repeatable component of the SAGC to create the non-repeatable component and determining an indication of clearance irregularity and/or touch down when the standard deviation of the non-repeatable component spikes.

Figure 1:
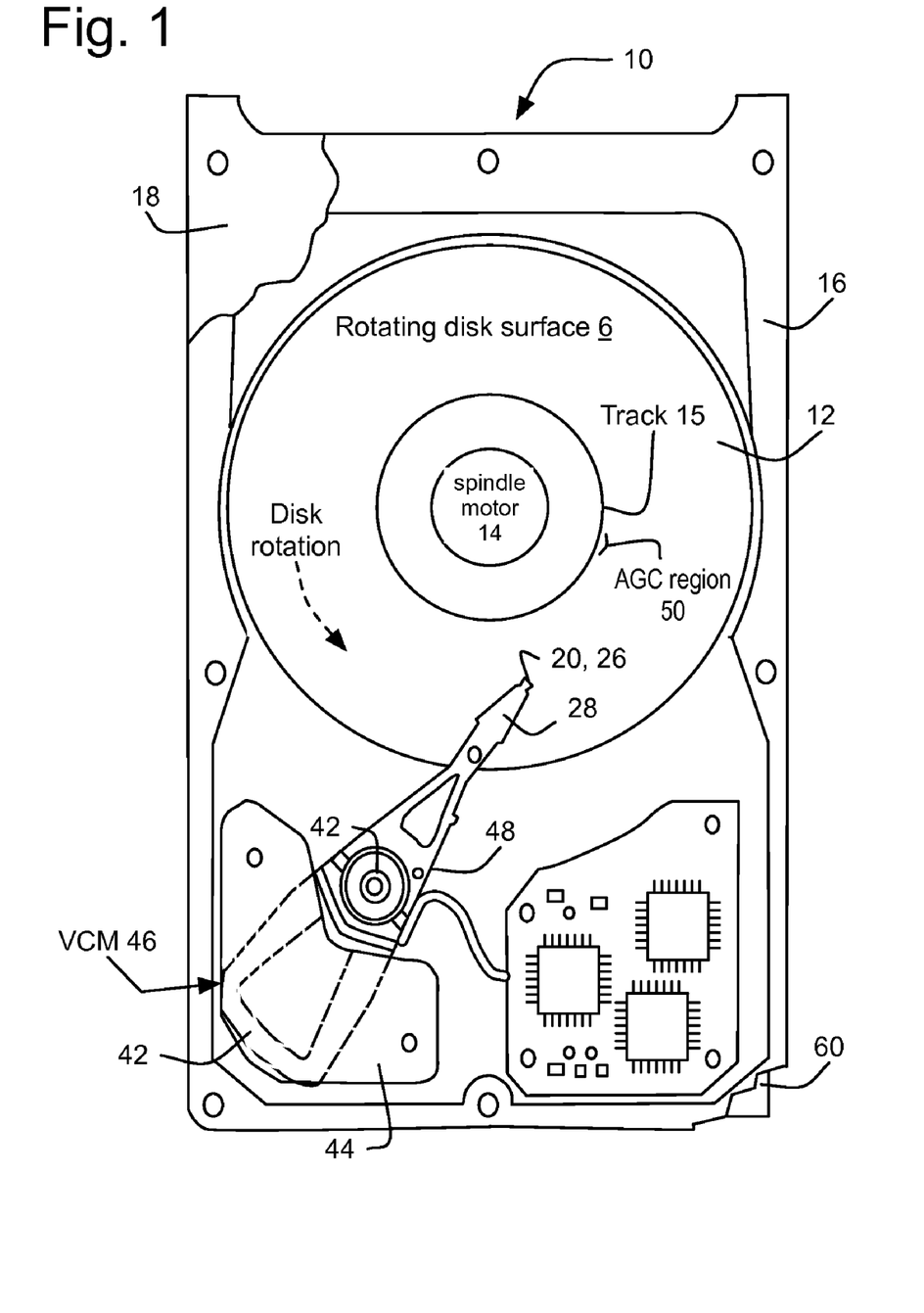
FIG. 1 shows an example of an embodiment of the invention as a hard disk drive including a disk base, a spindle motor mounted on the disk base and coupled with a disk to create a rotating disk surface including a track, a head stack assembly pivoting on the disk base to position a slider over the track on the rotating disk surface to read an Amplitude Gain Control (AGC) region, and a control circuit configured to receive a version of the read AGC pattern signal from the AGC region to determine a touch down flag or indication in response to the received version.

Referring to the drawings more particularly by reference numbers, FIG. 1 shows an example of an embodiment of the invention as a hard disk drive 10 including a disk base to which a spindle motor 14 is mounted with at least one disk 12 coupled to the spindle motor to create a rotating disk surface 6. A voice coil motor 46 includes a head stack assembly 48 pivotably mounted by an actuator pivot 40 to the disk base, responsive to its voice coil 42 interacting with a fixed magnetic assembly 44 mounted on the disk base to pivot a head gimbal assembly 26 position at least one slider 20 to access data stored in a track 15 on the rotating disk surface. The hard disk drive includes a control circuit 60 also mounted on the disk base often opposite the spindle motor and the voice coil motor that may be used to estimate the clearance and control the spindle motor, the voice coil motor and/or the slider. A disk cover 18 is mounted on the disk base to encapsulate all the shown components except the circuit board.

During these access operations the slider 20 reads an Amplitude Gain Control (AGC) region 50 as part of the track 15, and the control circuit 60 receives a version of the read AGC pattern signal from the AGC region to determine a touch down flag or indication in response to the received version. The touch down flag is used herein to indicate that either the clearance of the slider is unstable, or that the slider has contacted the rotating disk surface 6.

The hard disk drive 10 may access the data 15 arranged in tracks on the rotating disk surface 6 by controlling the spindle motor 14 to rotate the disks 12 at a specific rate. The data may be organized as tracks that may be configured as concentric circles or as a tightly packed spiral. The voice coil motor 46 operates by stimulating the voice coil 42 with a time varying electrical signal to magnetically interact with the fixed magnet assembly 34 causing the head stack assembly to pivot about the actuator pivot 40 moving the head gimbal assembly 28 to position the slider 20 near the track on the rotating disk surface. In many embodiments, a micro-actuator assembly preferably coupled to the slider may be further stimulated to further control the position of the slider. A resistive heater 24 either in the micro-actuator assembly, or preferably in the slider, may be stimulated to alter the clearance of the slider over the rotating disk surface.

Figure 2A:
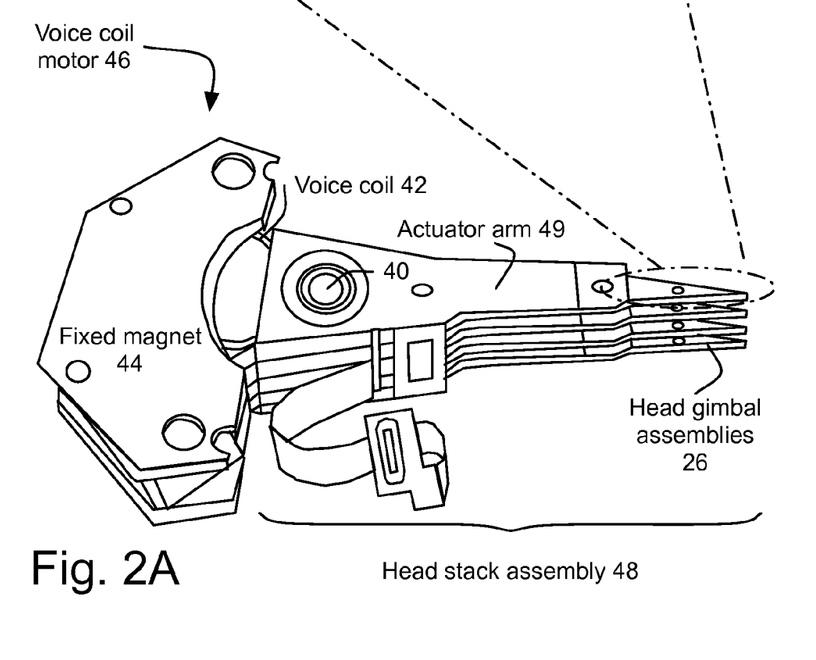
FIGS. 2A and 2B show some details of the head stack assembly of FIG. 1, including a Flying height On Demand (FOD) actuator configured to alter the clearance of the slider over the rotating disk surface. Note that touch down occurs when the slider contacts the disk surface, making the clearance zero nanometers (nm). Contemporary hard disk drives often operate at clearances of less than three nm when accessing the track's data.
Figure 2B:
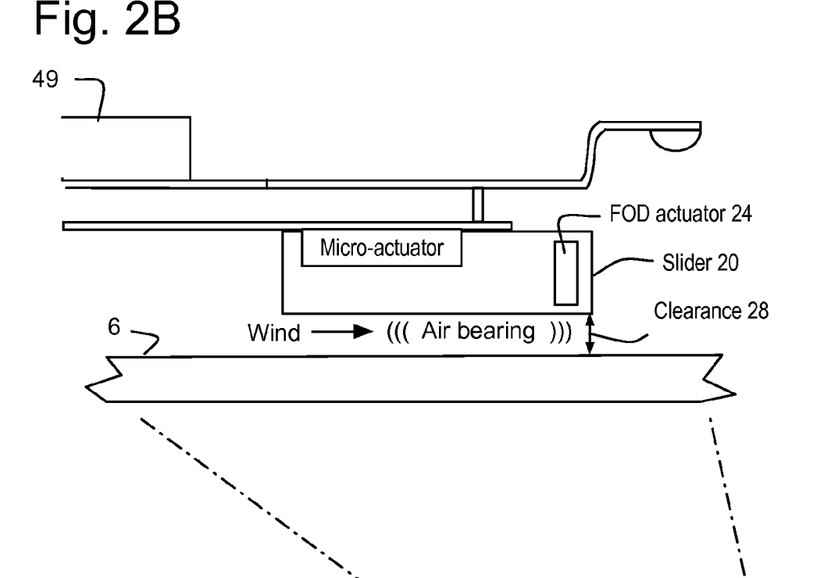

FIGS. 2A and 2B show some details of the head stack assembly 48 of FIG. 1, including a Flying height On Demand (FOD) actuator 24 configured to alter the clearance 28 of the slider 20 over the rotating disk surface 6. Note that touch down occurs when the slider contacts the disk surface, making the clearance zero nanometers (nm). Contemporary hard disk drives 10 often operate at clearances of less than three nm when accessing the track's data.

FIG. 2A shows a perspective view of the voice coil motor 45, its head stack assembly 48 and the one or more head gimbal assemblies 28 coupled to the one or more actuator arms 49.

FIG. 2B shows a side view of some details of a head gimbal assembly 26 of the previous Figures, in particular, the slider 20 may also include the FOD actuator 24 as a resistive heater and/or a micro-actuator to refine the position of the slider near the track 15 shown in FIG. 1. The resistive heater may be used to perform FOD to position the slider at a clearance 28 off the rotating disk surface. The micro-actuator may employ an electrostatic effect, a piezoelectric effect and/or a thermal mechanical effect to position the slider. The slider may use a perpendicular or longitudinal recording approach to accessing data 15 on the rotating disk surface and may employ a magneto-resistive effect or a tunneling effect to read the data.

Figure 3:
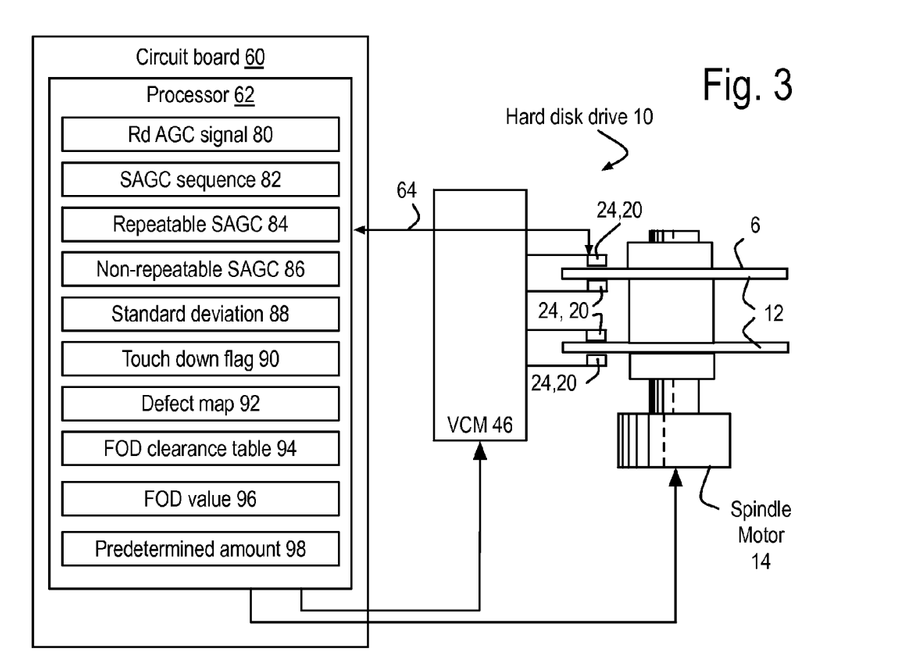
FIG. 3 shows some further details of the hard disk drive, with the control circuit including a processor configured to receive the version of the read AGC signal to create the Servo AGC (SAGC) sequence for the track, process the SAGC sequence to remove a repeatable component to create the non-repeatable component of the SAGC sequence, calculate a standard deviation of the non-repeatable SAGC, and determine touch down based upon the standard deviation exceeding a predetermined amount. The control circuit may also be configured to use the touch down flag to further create a defect map and/or a FOD clearance table.

FIG. 3 shows a simplified electrical schematic of the hard disk drive 10 of FIG. 1 where the circuit board 60 includes a processor 62 may be configured to stimulate the voice coil motor 46 to position the slider 20 near the track 15. The processor may further stimulate the spindle motor 14 to rotate the disks 12 of the hard disk drive to create the rotating disk surfaces.

The processor 62 may be configured to use the electrical connection 64 across the voice coil motor 46 to the slider 20, to receive the read AGC signal 80 of the track 15. The version of the read AGC signal may be used to create the Servo AGC (SAGC) sequence 82 for the track. The processor may process the SAGC sequence to remove a repeatable component 84 to create the non-repeatable component 86 of the SAGC sequence, calculate a standard deviation 88 of the non-repeatable SAGC, and determine the touch down flag 90 based upon the standard deviation exceeding a predetermined amount 98. This situation may be referred to as the non-repeatable SAGC spiking, or exceeding a determined baseline. The control circuit 60 may also be configured to use the touch down flag to further create a defect map 92 and/or a FOD clearance table 94. The control circuit may use the FOD clearance table to control the FOD value 96 that stimulates the FOD actuator 24 to alter the clearance 28 of the slider 20.

In various embodiments, the control circuit 60 may be implemented as a printed circuit, a multi-chip module and/or an integrated circuit. The processor 62 may be implemented as a multi-chip module and/or one or more integrated circuits.

Figure 4:
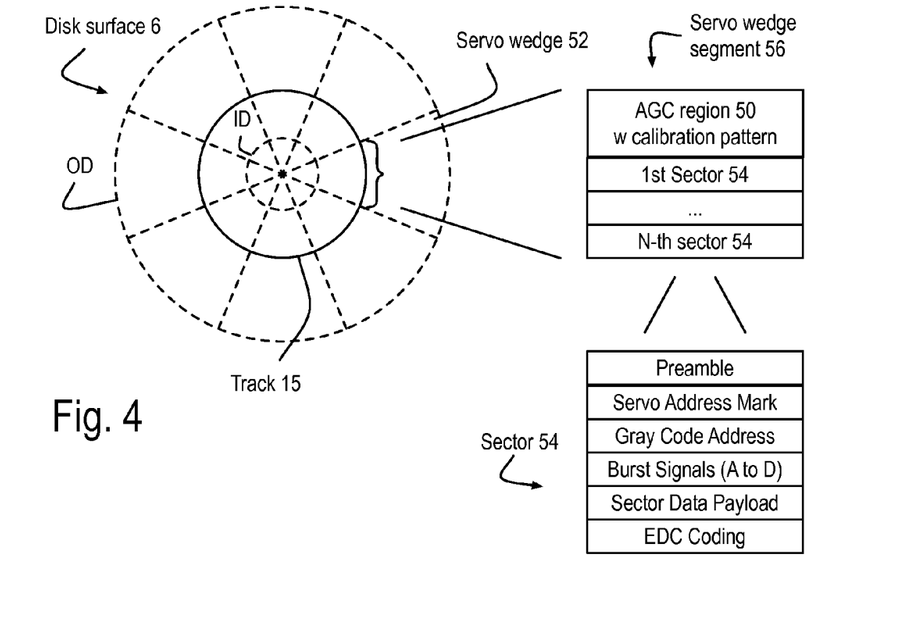
FIG. 4 shows the disk surface organized into servo wedges that every track intersects at a servo wedge segment that typically includes an AGC calibration region shown in FIG. 1, as well as one or more sectors that typically include a number of fields accessed by the hard disk drive during reading and writing.

FIG. 4 shows a simplified example of the disk surface 6 organized into servo wedges 52 that every track 15 intersects at a servo wedge segment 56 that includes the AGC calibration region 50 shown in FIG. 1, as well as one or more sectors 54 that typically include a number of fields including a sector data payload, which is the data accessed by the hard disk drive. For example, each of the sectors may include a preamble, a servo address mark, a gray code address, the burst signals often referred to as A, B, C and D, a sector data payload and an Error Detection/Correction (EDC) coding component. The tracks may be further organized into zones of radial neighbors starting at the Inside Diameter (ID) and proceeding to the Outside Diameter (OD).

Figure 5:
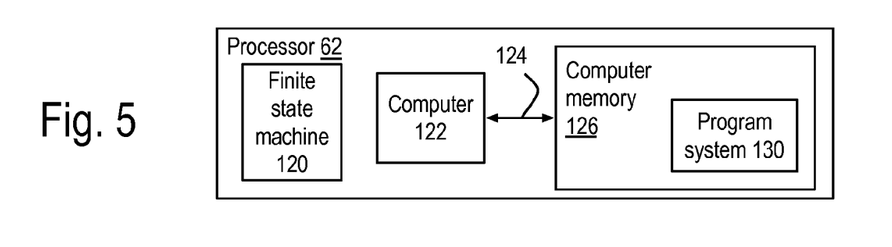
FIG. 5 shows some details of the processor of FIG. 3 including one or more instances of a finite state machine and/or a computer configured to access a computer memory including a program system. The program system may be configured to instruct the processor and/or the control circuit in accord with at least some of the flowcharts of FIGS. 6 to 9.

FIG. 5 shows a simplified block diagram of the processor 62 including at least one instance of a finite state machine 120 and/or a computer 122 accessibly coupled 124 via a buss to a computer memory 126 containing a program system 130 for instructing the computer to at least partly implement an embodiment of the invention's method. As used herein, the processor may or may not be included in the control circuit 60 of FIGS. 1 and 3. For instance, during the manufacture of the hard disk drive, the processor and the computer memory may not be included in the hard disk drive.

As used herein a finite state machine 120 receives at least one input and generates at least one output and may update and/or maintain at least one state, with at least one of the outputs being generated based upon the value of at least one of the inputs and/or the value of at least one of the states.

As used herein, a computer 122 may include at least one data processor and at least one instruction, with each of the data processors being instructed by at least one of the instruction processors and at least one of the instruction processors are instructed by at least one program step of the program system 130 in accord with at least one of the invention's methods. The computer readable memory may or may not include a non-volatile memory that can retain its memory contents without an external supply of power.

As used herein, starting a flowchart may include storing at least part of the states of the finite state machine 120, and/or at least part of the state of the computer 122, possibly by pushing a return state. The program steps may be implemented by states and/or state transitions in the finite state machine and/or as threads or tasks executed as program instructions by the computer. The exiting of the flowchart may include returning at least part of the state of the finite state machine and/or the computer, which may effect a return from a subroutine call in some situations.

The program system 130 may be configured to instruct the computer 122, the processor 62, and/or the control circuit 60 in accord with at least some of the flowcharts of FIGS. 6 to 9.

Figure 6:
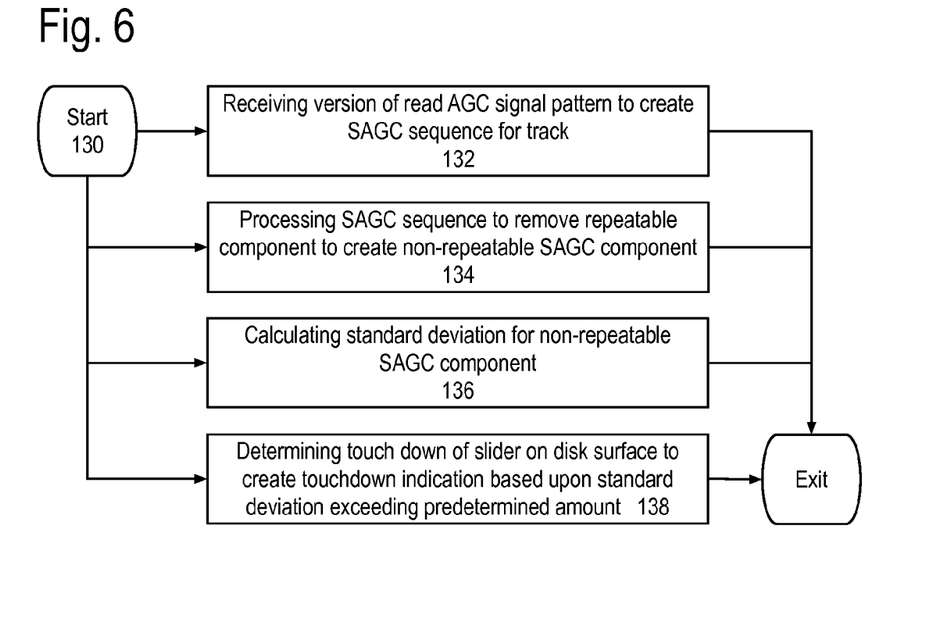
FIG. 6 shows the program system including program steps to receive the version of the read AGC signal to create the Serve AGC (SAGC) sequence for the track, process the SAGC sequence to remove a repeatable component to create the non-repeatable component of the SAGC sequence, calculate a standard deviation of the non-repeatable SAGC, and determine touch down based upon the standard deviation exceeding a predetermined amount.

FIG. 6 shows the program system 130 may include at least one of the following: Program step 132 supports receiving the version of the read AGC signal pattern 80 to create the SAGC sequence 82 for the track 15. Program step 134 supports processing the SAGC sequence to remove the repeatable SAGC component 84 to create the non-repeatable SAGC component 86. Program step 136 supports calculating the standard deviation 88 for the non-repeatable SAGC component. And program step 138 supports determining touch down of the slider 20 on the disk surface 6, or that the clearance 28 is unstable, to create the touch down flag 90 based upon the standard deviation exceeding a predetermined amount, which may be referred to as the non-repeatable SAGC component spiking, or exceeding a determined baseline.

As used herein, the standard deviation 88 may be calculated by any of the standard or near standard algorithms. For instance, each of these algorithms takes the square root of a sum formed of the squares of the samples subtracted from a mean of those samples, with the sum then scaled by the reciprocal of the number of samples, possibly offset by one or some other small number. In certain embodiments, rather than the mean being used as the average of the sum of the samples divided by the number of samples, the median or the midpoint value of the samples may be used and/or the sum of the samples may be divided by the number of samples minus a small number such as one.

As used herein, the predetermined amount 98 may be a constant derived from the manufacturing process for the hard disk drive 10, or derived based upon the calibration of the hard disk drive. The derived predetermined amount may be an average of a fixed window of the standard deviations 88 for other tracks 15, other servo wedge segments 56, and/or for other FOD values 96, possibly of the same track.

The comparison of the standard deviation 88 and the predetermined value 98 performed in program step 138 may be calculated without taking square roots. It may further involve higher powers of the standard deviation, for example the comparison may be between the fourth power of the standard deviation to a scale factor multiplied by the average of the fourth powers of standard deviations for a fixed window of other tracks 15, other servo wedge segments 56, and/or other FOD values 96. In some embodiments the scale factor may be between two and 8, or between three and four, or possibly a value such as three and a half.

Figure 7:
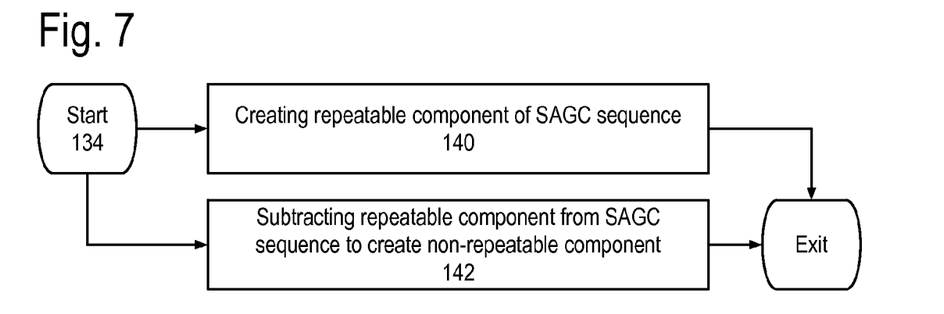
FIG. 7 shows some details of processing the SAGC sequence to create the non-repeatable SAGC component.

FIG. 7 shows some further details of program step 134, including the following: Program step 140 supports creating the repeatable SAGC component 84 of the SAGC sequence 82. Program step 142 supports subtracting the repeatable SAGC component from the SAGC sequence 82 to create the non-repeatable SAGC component 86.

Figure 8:
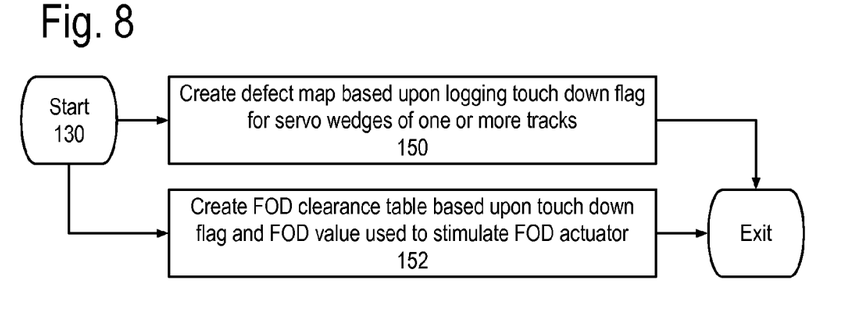
FIG. 8 shows some extensions to the program system of previous Figures to include creating the defect map and/or creating the FOD clearance table, both based upon the touch down flag.

FIG. 8 shows the program system 130 and the method of operating the hard disk drive 10. The program system may further include any combination of program steps 150 and 152. Program step 150 supports creating the defect map 92 based upon logging the touch down flag 90 for servo wedges 52 of one or more tracks 15, which may further belong to radial zones extending from the inside diameter to the outside diameter of the disk surface 6. Program step 152 supports creating the FOD clearance table based upon the touch down flag and the FOD value 96 used to stimulate the FOD actuator 24.

Figure 9:
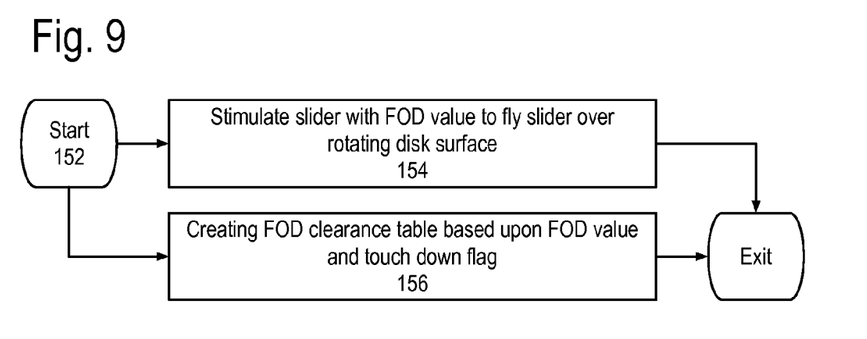
FIG. 9 shows some details of the program step creating the FOD clearance table.

FIG. 9 shows some details of program step 152 in creating the FOD clearance table 94 by including the following: Program step 154 supports stimulating the slider 20 with the FOD value 96 to fly the slider over the rotating disk surface 6. Program step 156 supports creating the FOD clearance table based upon the FOD value and the touch down flag.

Consider the following example of this method of creating the FOD clearance table 94 based upon the flowcharts of FIGS. 8, 9, 5 and 6: In executing program step 152 of FIG. 8 to create the FOD clearance table 94, program steps 154 and 156 may be repeatedly executed.

Program step 154 may be executed to let the FOD value 96 be used to stimulate the FOD actuator 24 be set to an initial value, say 0, that may place the slider 20 as far away from the rotating disk surface 6 as the FOD actuator 24 can, while being in position to read data from a track 15.

Program step 156 may be executed, which may in turn invoke program steps 132 to 138 to create the touch down flag 90 based upon the FOD value 96 as shown through the following examples:

Regarding program step 132: Nrev revolutions of SAGC sequences 82 for one track 15 are read at each servo wedge segment 56. Assume that there are Nwedge of the servo wedges, where Nwedge may be at least 128, or 256, or possibly 264. Let a[i j] denote the SAGC value for revolution i at servo wedge segment j. This array a[i j] embodies the read AGC signal pattern 80. The SAGC sequence 82 is calculated as the average AGC signal pattern Avg over the servo wedges of the track 15 for each time i the track is read, as $$\text{Avg}[i] = \Sigma_j^{Nwedge} a[i\,j]/Nwedge \quad (1)$$

Regarding the program step 134: The repeatable SAGC component, $\text{SAGC}_{repeat}[i\,j] = \text{SAGC}[i\,j] - \text{Avg}[i]$ may need an adjustment to compensate for residual readings of the AGC pattern signal when the FOD value 96 is set to the initial value, placing the slider 20 as far away from the rotating disk surface 6 and still be within a clearance 28 to read something.

Let $\text{SAGC}_{REF}[j]$ be the repeatable SAGC signal reading for the j servo wedge segment 56, and $r_j$ as the average of Nrev reads of the track 15 with FOD value at the initial value for each j servo wedge. Further refining this definition, let $\text{Avgr} = (\Sigma_{j=1}^{Nwedge} r_j)/Nwedge$. Then $$\text{SAGC}_{REF}[j] = r_j - \text{Avgr} \quad (2)$$

is the repeatable component of the SAGC readings for the FOD value set to the initial value. The repeatable SAGC component 84, in some embodiments, may then be the sum Avg[i]+SAGC$_{REF}$[j]. And the non-repeatable SAGC component 86 may be $$SAGCnonrept(i,j)=a[i,j]-(Avg[i]+SAGC_{REF}[j]) \quad (3)$$

Regarding program step 136: The standard deviation 88 may be calculated for each time the track 15 was read and then averaged as follows:

$$\sigma^2=\Sigma_i^{Nrev}(StdDev(SAGC_{nonrept}(i,j))_j^{Nwedge})^2/Nrev \quad (4)$$

Regarding program step 138: The touch down flag 90 may be determined when the fourth power of σ exceeds a scale factor such as three and a half multiplied by the fixed window average of the fourth powers of the σ's of neighboring tracks 15, and/or neighboring servo wedge segments 56, and/or neighboring FOD values 96. Note that as used herein, something may be neighboring without being adjacent, for instance an FOD value of 0 may be a neighbor of an FOD value of five or ten.

Figure 10:
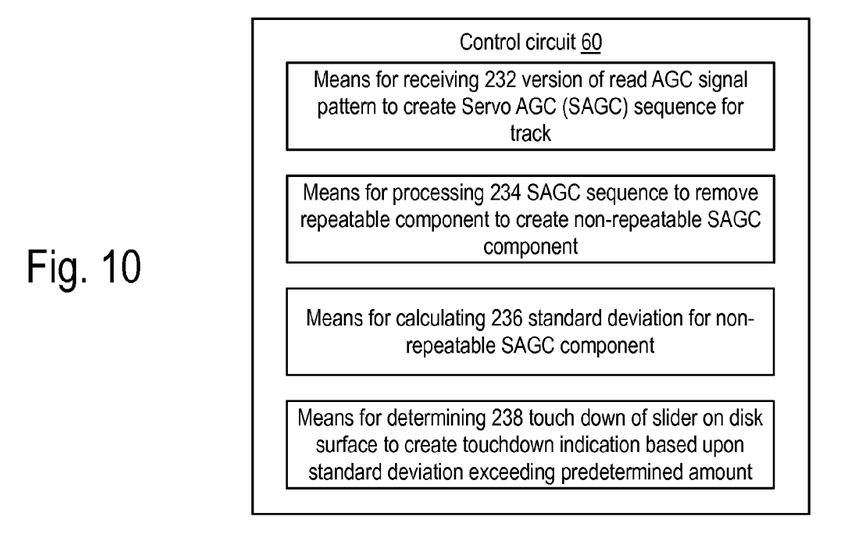
FIG. 10 shows the control circuit may include at least one of several means, each of which may include instances of finite state machines, and/or a computer (which may be shared), and/or program steps of the program system discussed in FIGS. 5 to 9.
Figure 11A:
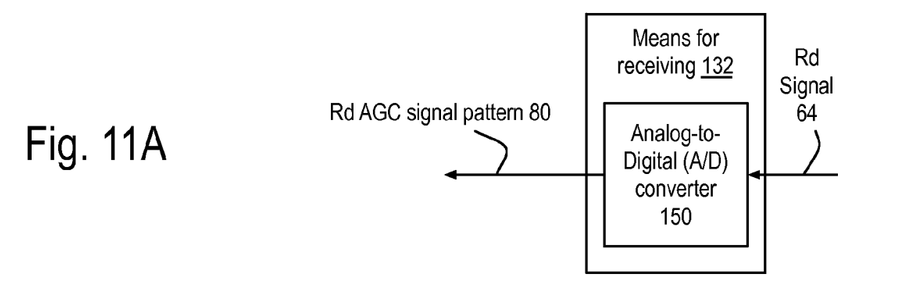
FIGS. 11A to 11D show some example embodiments of the means for receiving the read AGC pattern signal to create the version of the read AGC pattern signal.
Figure 11B:
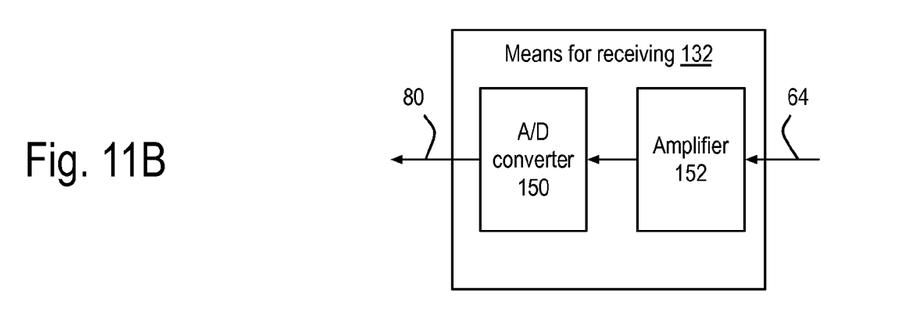
Figure 11C:
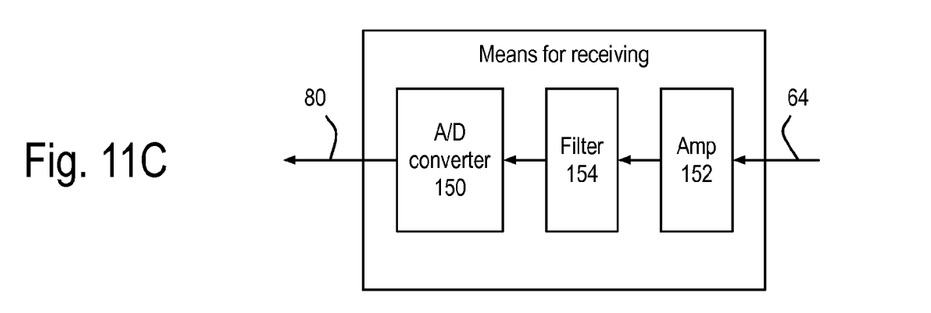
Figure 11D:
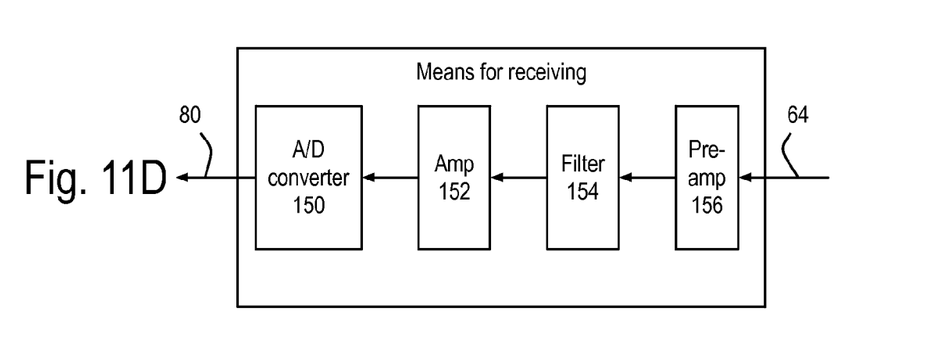

FIG. 10 shows a simplified block diagram of the control circuit 60 that may include one or more of the following: Means for receiving 232 the version of the read AGC signal pattern 80 to create the SAGC sequence 82 for the track 15. Means for processing 234 the SAGC sequence to remove the repeatable SAGC component 84 to create the non-repeatable SAGC component 86. Means for calculating 236 the standard deviation 88 for the non-repeatable SAGC component. And Means for determining 238 touch down of the slider 20 on the disk surface 6, or that the clearance 28 is unstable, to create the touch down flag 90 based upon the standard deviation exceeding a predetermined amount, which may be referred to as the non-repeatable SAGC component spiking, or exceeding a determined baseline.

Various embodiments of these means 232, 234, 236 and 238 may include all or part of an instance of the finite state machine 120 of FIG. 5 and/or the computer 122 and/or the program system 130. In particular, means for receiving 232 may include the program step 132 of FIG. 6. Means for processing 234 may include the program step 134. Means for calculating 236 may include the program step 136. And means for determining 238 may include the program step 138.

FIG. 11A to 11D show some further example embodiments of the means for receiving 232 the read AGC pattern signal 64 to create the version of the read AGC pattern signal 80. Each of these Figures show the means for receiving including an Analog-to-Digital (A/D) converter 150 at least partly creating the version of the read AGC pattern signal. The various embodiments of the means for receiving may further include any combination of an amplifier 152, a filter 154 and/or a preamplifier 156. The amplifier's, and/or the preamplifier's, gain control may be set based upon the SAGC value of the SAGC sequence 82 during normal read operations to support reading the sectors 54 within the servo wedge segment 56. The one or more filters 152 may implement any of the following: a notch filter, a low pass filter, a high pass filter, a band pass filter, and/or a discrete wavelet filter.

The preceding embodiments provide examples of the invention, and are not meant to constrain the scope of the following claims.

What is claimed is:

1. A hard disk drive, comprising:
 a disk base;
 a spindle motor mounted on said disk base and rotably coupled to at least one disk to create at least one rotating disk surface including multiple tracks each intersecting multiple servo wedges at an Amplitude Gain Control (AGC) calibration pattern;
 a head stack assembly pivotably mounted by an actuator pivot to said disk base and configured position a slider on said rotating disk surface to read said AGC calibration pattern to create a read AGC pattern signal; and
 a control circuit configured to
 receive a version of said read AGC pattern signal to create a Servo AGC (SAGC) sequence for said track,
 process said SACG sequence for said track to remove a repeatable component of said SAGC sequence to create a non-repeatable SAGC component,
 calculate a standard deviation for said non-repeatable SAGC component, and
 determine touch down of said slider on said rotating disk surface based upon said standard deviation exceeding a predetermined amount.

2. The hard disk drive of claim 1, said version of said read AGC pattern signal is at least partly generated by at least one member of the group consisting of an analog-to-digital converter, at least one filter, a preamplifier and an amplifier, each included in said hard disk drive.

3. The hard disk drive of claim 1, wherein said control circuit configured to create said SAGC sequence for said track is further configured to create said SAGC sequence for each of at least two of said servo wedges of said track.

4. The hard disk drive of claim 3, wherein said control circuit is further configured to create said SAGC sequence for each of said servo wedges of said track.

5. The hard disk drive of claim 1, wherein said control circuit is further configured to process said SACG sequence by
 creating said repeatable component of said SAGC sequence and by
 subtracting said repeatable component from said SAGC sequence to create said non-repeatable component.

6. The hard disk drive of claim 5, wherein said control circuit is further configured to average at least two of said SAGC sequences for said track to create said repeatable component.

7. The hard disk drive of claim 1, wherein said control circuit includes at least one instance of at least one member of the group consisting of a finite state machine and a computer configured to access a memory including a program system comprised of program steps to instruct said computer.

8. The hard disk drive of claim 7, wherein said program system includes at least one of the program steps of:
 receiving said version of said read AGC pattern signal to create said SAGC sequence for said track;
 processing said SACG sequence for said track to remove said repeatable component of said SAGC sequence to create said non-repeatable SAGC component;
 calculating said standard deviation for said non-repeatable SAGC component; and
 determining said touch down of said slider on said rotating disk surface based upon said standard deviation exceeding said predetermined amount.

9. A control circuit for use in a hard disk drive, comprising:
 said control circuit configured to
 receive a version of a read Amplitude Gain Control (AGC) pattern signal to create a Servo AGC (SAGC) sequence for a track intersecting multiple servo wedges at an AGC calibration pattern read by a slider positioned over said track to create said read AGC pattern signal, process said SACG sequence for said track to remove a repeatable component of said SAGC sequence to create a non-repeatable SAGC component, calculate a standard deviation for said non-repeatable SAGC component, and determine touch down of said slider on said rotating disk surface based upon said standard deviation exceeding a predetermined amount.

10. The control circuit of claim 9 further configured to create said SAGC sequence for each of said servo wedges of said track.

11. The control circuit of claim 9 further configured to process said SACG sequence by creating said repeatable component of said SAGC sequence and by subtracting said repeatable component from said SAGC sequence to create said non-repeatable component.

12. The control circuit of claim 11 further configured to average at least two of said SAGC sequences for said track to create said repeatable component.

13. The control circuit of claim 9 further configured to couple to a printed circuit board for mounting to a disk base of said hard disk drive.

14. The control circuit of claim 9, including at least one instance of at least one member of the group consisting of a finite state machine and a computer configured to access a memory including a program system comprised of program steps to instruct said computer.

15. The control circuit of claim 14, wherein said program system includes at least one of the program steps of:

receiving said version of said read AGC pattern signal to create said SAGC sequence for said track;

processing said SACG sequence for said track to remove said repeatable component of said SAGC sequence to create said non-repeatable SAGC component;

calculating said standard deviation for said non-repeatable SAGC component; and determining said touch down of said slider on said rotating disk surface based upon said standard deviation exceeding said predetermined amount.

16. The control circuit of claim 9 implemented as an integrated circuit.

17. The control circuit of claim 9, comprising at least one of:

means for receiving said version of said read AGC pattern signal to create said SAGC sequence for said track;

means for processing said SACG sequence for said track to remove said repeatable component of said SAGC sequence to create said non-repeatable SAGC component;

means for calculating said standard deviation for said non-repeatable SAGC component; and means for determining said touch down of said slider on said rotating disk surface based upon said standard deviation exceeding said predetermined amount.

18. The control circuit of claim 17, wherein at least one of the means for receiving, the means for processing, the means for calculating and the means for determining includes at least one instance of at least one member of the group consisting of a finite state machine and a computer configured to access a memory including a program system comprised of program steps to instruct said computer.

19. The control circuit of claim 17, wherein said means for receiving includes at least one member of the group consisting of an analog-to-digital converter, a filter, a preamplifier and an amplifier.

20. A method, comprising the step of:

operating a hard disk drive that positions a slider over a track on a rotating disk surface to create a touch down flag, with said track intersecting multiple servo wedges at an Amplitude Gain Control (AGC) calibration pattern; and operating a control circuit within said hard disk drive and in communication with said slider to create said touch down flag, further comprising the steps of:

receiving a version of said read AGC pattern signal to create a Servo AGC (SAGC) sequence for said track, processing said SACG sequence for said track to remove a repeatable component of said SAGC sequence to create a non-repeatable SAGC component, calculating a standard deviation for said non-repeatable SAGC component, and determining touch down of said slider on said rotating disk surface based upon said standard deviation exceeding a predetermined amount to create said touch down flag.

21. The method of claim 20, wherein said touch down flag is specific to at least one of said servo wedges of said track.

22. The method of claim 20, wherein the step operating said control circuit further comprises the step of:

logging said touch down flag for said servo wedge to create a defect map.

23. The defect map as a product of the process of claim 22.

24. The method of claim 20, wherein the step operating said hard disk drive further comprises the step of stimulating said slider with a Flying height on Demand (FOD) value to fly said slider over said rotating disk surface; and wherein the step operating said control circuit further comprises the step of creating a FOD clearance table for at least said track based upon said FOD value and said touch down flag.

25. The FOD clearance table as a product of the process of claim 24.

* * * * *